US012534866B2

(12) United States Patent
Conte

(10) Patent No.: US 12,534,866 B2
(45) Date of Patent: Jan. 27, 2026

(54) SYSTEM AND METHOD FOR INSTALLING AN AGGREGATE PIER

(71) Applicant: Geopier Foundation Company, Inc., Davidson, NC (US)

(72) Inventor: Matthew Alan Conte, Davidson, NC (US)

(73) Assignee: Geopier Foundation Company, Inc., Davidson, NC (US)

( * ) Notice: Subject to any disclaimer, the term of this patent is extended or adjusted under 35 U.S.C. 154(b) by 0 days.

(21) Appl. No.: 18/629,344

(22) Filed: Apr. 8, 2024

(65) Prior Publication Data

US 2024/0254713 A1    Aug. 1, 2024

Related U.S. Application Data

(63) Continuation of application No. 17/823,656, filed on Aug. 31, 2022, now Pat. No. 11,952,736.

(60) Provisional application No. 63/365,044, filed on May 20, 2022, provisional application No. 63/260,798, filed on Aug. 31, 2021.

(51) Int. Cl.
  *E02D 3/08* (2006.01)
  *E02D 5/36* (2006.01)

(52) U.S. Cl.
  CPC ............... *E02D 3/08* (2013.01); *E02D 5/36* (2013.01); *E02D 2200/1685* (2013.01); *E02D 2250/0023* (2013.01); *E02D 2300/0079* (2013.01)

(58) Field of Classification Search
  CPC ............. E02D 3/08; E02D 3/123; E02D 5/36
  USPC ........................................................ 405/255
  See application file for complete search history.

(56) References Cited

U.S. PATENT DOCUMENTS

| 5,722,498 | A | 3/1998 | Van Impe |
| 6,354,766 | B1 | 3/2002 | Fox |
| 6,672,015 | B2 | 1/2004 | Cagnon |
| 7,226,246 | B2 * | 6/2007 | Fox ......................... E02D 5/385 405/255 |
| 7,604,437 | B2 | 10/2009 | Wissmann et al. |
| 7,748,932 | B2 | 7/2010 | Lindsey |

(Continued)

FOREIGN PATENT DOCUMENTS

| AU | 2012241026 A1 | 4/2013 |
| AU | 2015349623 A1 | 7/2017 |

(Continued)

*Primary Examiner* — Frederick L Lagman
(74) *Attorney, Agent, or Firm* — E. Eric Mills; Todd A. Serbin; Maynard Nexsen PC

(57) ABSTRACT

A system and method for installing an aggregate pier in a soil matrix includes a pipe configured to interface with a torque driver for rotating the pipe. A helix is disposed on the pipe and configured to advance/withdraw the pipe based on direction of rotation. A compacting device is disposed between the distal end of the pipe and the helix. It extends radially outward and upward. In some embodiments, the compacting device is configured as a frustum. A lift in an aggregate pier is formed by rotating the pipe in a second direction to withdraw a portion of the pipe from the soil matrix thereby creating a void; (b) filling the void with aggregate; (c) rotating the pipe in the first direction to advance the pipe. The compacting device contacts the aggregate disposed in the void and imparts an axial and radial force.

13 Claims, 13 Drawing Sheets

(56) References Cited

U.S. PATENT DOCUMENTS

| | | | |
|---|---|---|---|
| 7,901,159 B2* | 3/2011 | Fox .................... E02D 5/385 |
| | | | 405/255 |
| 7,914,236 B2 | 3/2011 | Neville | |
| 8,033,757 B2 | 10/2011 | Stroyer | |
| 8,152,415 B2* | 4/2012 | Fox ...................... E02D 5/44 |
| | | | 405/255 |
| 8,360,689 B2* | 1/2013 | Maher ................. E02D 3/123 |
| | | | 405/271 |
| 8,926,228 B2 | 1/2015 | Stroyer | |
| 9,057,169 B1 | 6/2015 | Perko | |
| 9,115,477 B2 | 8/2015 | Mcmillan | |
| 9,169,611 B2* | 10/2015 | Fox ...................... E02D 5/46 |
| 9,284,708 B2 | 3/2016 | Neville | |
| 9,637,882 B2* | 5/2017 | Wissmann ............ E02D 5/44 |
| 10,458,090 B2 | 10/2019 | Raposo et al. | |
| 10,480,144 B2 | 11/2019 | Stroyer | |
| 10,683,630 B2 | 6/2020 | Descamps et al. | |
| 10,767,334 B2 | 9/2020 | Perko et al. | |
| 10,865,539 B2 | 12/2020 | Raposo et al. | |
| 10,876,267 B2 | 12/2020 | Stroyer | |
| 10,934,677 B2 | 3/2021 | Mar et al. | |
| 10,947,688 B2 | 3/2021 | Perko et al. | |
| 10,954,644 B2 | 3/2021 | Neville | |
| 11,001,981 B2 | 5/2021 | Stroyer | |
| 11,952,736 B2* | 4/2024 | Conte ..................... E02D 7/22 |
| 2002/0008328 A1 | 1/2002 | Williams | |
| 2006/0013656 A1 | 1/2006 | Blum | |
| 2008/0101873 A1 | 5/2008 | Fox | |
| 2008/0157521 A1 | 7/2008 | Davis | |
| 2008/0193223 A1 | 8/2008 | Wissmann | |
| 2010/0054864 A1 | 3/2010 | Stroyer | |
| 2010/0263928 A1 | 10/2010 | Massari | |
| 2011/0229272 A1 | 9/2011 | Lindsay | |
| 2013/0004243 A1 | 1/2013 | Defrang | |
| 2015/0322641 A1 | 11/2015 | Mcmillan | |
| 2019/0316312 A1 | 10/2019 | Mcmillan | |
| 2020/0115874 A1 | 4/2020 | Mar et al. | |

FOREIGN PATENT DOCUMENTS

| | | |
|---|---|---|
| JP | 2015183395 A | 10/2015 |
| KR | 100668504 B1 | 1/2007 |
| KR | 20120072725 A | 7/2012 |

* cited by examiner

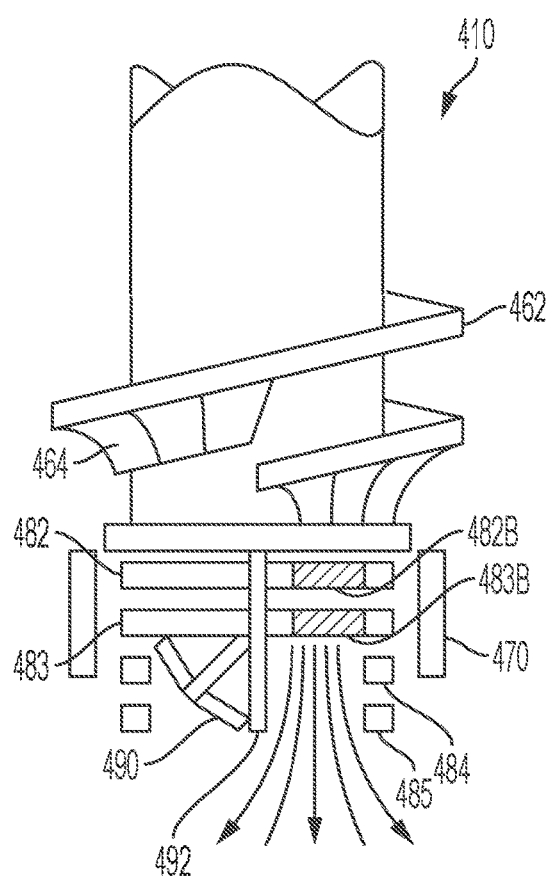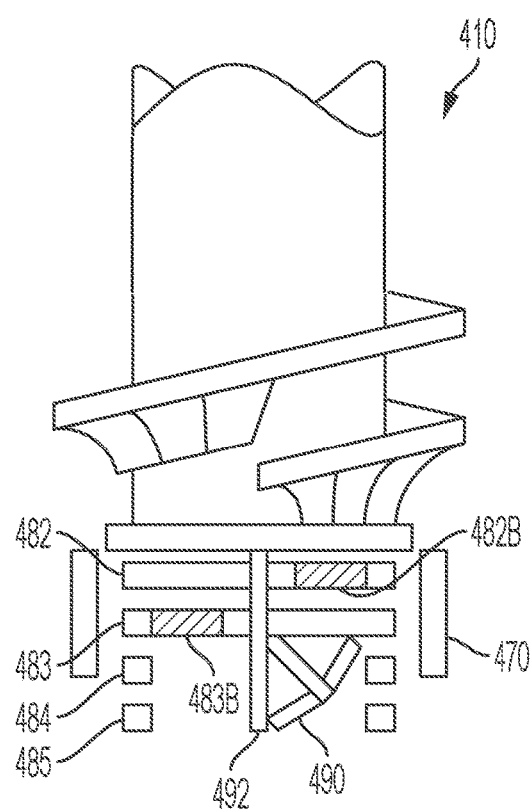
FIG. 9A
FIG. 9B

SYSTEM AND METHOD FOR INSTALLING AN AGGREGATE PIER

CROSS-REFERENCE TO RELATED APPLICATIONS

This application is a continuation of and claims priority to U.S. patent application Ser. No. 17/823,656 filed Aug. 31, 2022 entitled "A System and Method for Installing an Aggregate Pier", now issued as U.S. Pat. No. 11,952,736, and which claims the benefit of U.S. Provisional Application Ser. No. 63/260,798 entitled "System and Method for Installing an Aggregate Pier" filed on Aug. 31, 2021, and also claims the benefit of U.S. Provisional Application Ser. No. 63/365,044 entitled "System and Method for Installing an Aggregate Pier" filed on May 20, 2022; the entire disclosures of which are incorporated herein by reference.

TECHNICAL FIELD

The present disclosure generally relates to ground improvements. More specifically, the present disclosure relates to a system and a method for installing ground improvements. More specifically, the present invention relates to a system and method for installing aggregate piers.

BACKGROUND

Heavy or settlement-sensitive facilities that are located in areas containing soft or weak soils are often supported on deep foundations. Such deep foundations are typically made from driven pilings or concrete piers installed after drilling. The deep foundations are designed to transfer structural loads through the soft soil matrices to a more competent soil stratum.

In recent years, aggregate piers have been used increasingly to support structures located in areas containing a soft soil matrix. It should be understood that the term aggregate pier and stone column have the same general meaning when used herein. The piers are designed to reinforce and strengthen the soft matrix and minimize resulting settlements therein. Such piers are constructed using a variety of methods.

A first method includes the step of forming a cavity in the soil matrix by withdrawing material from the soil matrix to form the cavity. Next, the method includes the step of filling the cavity with successive lifts of aggregate, and compacting the lifts in serial order to form a short aggregate pier in the cavity comprised of multiple lifts. A disadvantage of this method is that it requires multiple steps and equipment thereby increasing the cost and time associated with the installation thereof. For example, the method first requires the drilling and excavating. Typically, this is performed with a first machine. Next the method requires a machine to impart an axial ramming force on the gravel. This is performed by a second machine and typically requires a large mast rig to support the ramming force. Thus, a disadvantage of this system is that requires multiple steps and equipment changes. Another disadvantage of this method is that the soil matrix is removed from the cavity, and thus must be removed from the site.

A second method for forming and aggregate pier is lateral displacement. The lateral displacement pier is built by ramming an open ended pipe into the ground, drilling out the soil matrix inside the pipe, filling the pipe with aggregate, and using the pipe to transfer an axial ramming force that compacts the aggregate in thin lifts. A disadvantage of this method is that it requires multiple steps of ramming and drilling and therefore necessitates the use of multiple pieces of equipment to provide the aggregate pier. Another disadvantage of this method is that the soil matrix is removed from the cavity, and thus must be removed from the site.

A third method for forming an aggregate pier is the impact pier method. This method differs from lateral displacement in that it does not result in soil matrix being withdrawn from the installation site. In this case, a smaller diameter tamper head is connected to the distal end of a pipe rammed into the ground. The pipe is filled with crushed stone once the tamper head is driven to the design depth. The tamper head is then lifted, thereby allowing stone to remain in the cavity, and then the tamper head is driven back down in a vertical axial manner in order to densify each lift of aggregate. A disadvantage of the impact pier is that it requires a large mast or derrick to support the axial impact ram. A further disadvantage is that the technique requires repeated ramming force that can cause site disturbance and material sound nuisance. This nuisance is a significant disadvantage in suburban and urban building sites. A further disadvantage of this method and the above described methods is that it difficult to precisely control the width or diameter of the aggregate lifts formed via axial ramming.

SUMMARY

The needs set forth herein as well as further and other needs and advantages are addressed by the present teachings, which illustrate solutions and advantages described below.

The present invention resides in on aspect in a system for installing an aggregate pier in a soil matrix. The system includes a pipe extending along a pipe axis between a distal end and a proximal end. The pipe defines a bore extending therethrough along the pipe axis. The pipe has a first opening proximate to the distal end of the pipe. The first opening is in fluid communication with the bore. The pipe has a second opening remote from the distal end. The second opening is in fluid communication with the bore. The first opening, second opening, and bore are in fluid communication such that an aggregate for forming the aggregate pier can pass through the second opening, the bore, and the first opening. An area of the pipe remote from the distal end of the pipe is configured to interface with a torque driver for rotating the pipe about the pipe axis. The pipe is rotatable in a first direction about the pipe axis. The pipe is rotatable in a second direction about the pipe axis, the second direction being opposite the first direction. A helix is disposed on the pipe between the second opening and the distal end. The helix extends along at least a portion of an outer surface of the pipe. The helix extends radially from the pipe axis between the outer surface of the pipe to an outer edge of the helix. The helix is configured such that when the helix is received in a soil matrix and the pipe is rotated in the first direction the helix imparts an axial force on the pipe in the direction of the distal end of the pipe thereby advancing the pipe into the soil matrix. The helix is further configured such that when the helix is received in a soil matrix and the pipe is rotated in the second direction the helix imparts an axial force on the pipe in the direction of the proximal end of the pipe thereby withdrawing the pipe from the soil matrix.

In yet a further embodiment of the system for installing an aggregate pier in a soil matrix the system includes a compacting device fixed relative to the pipe and positioned between the distal end of the pipe and a bottom surface of the helix. The compacting device defines a compacting surface extending radially outward from the outer surface of the pipe and extending upward in a direction of the proximal end of the pipe. The compacting surface is configured to impart an axial force and a radial force on soil matrix adjacent thereto when the pipe is rotated in the first direction.

In yet a further embodiment of the system for installing an aggregate pier in a soil matrix the helix extends along the outer surface of the pipe for at least one pitch of the helix.

In yet a further embodiment of the system for installing an aggregate pier in a soil matrix, the compacting device extends substantially around the outside surface of the pipe in a plane substantially perpendicular to the pipe axis.

In yet a further embodiment of the system for installing an aggregate pier in a soil matrix, a cap is positioned proximate to the distal end of the pipe. The cap closes the first opening in the pipe when the cap is received on the distal end of the pipe. The cap is configured to be removed from the position at the distal end of the pipe and placed at the bottom of an aggregate pier formed by the system.

In yet a further embodiment of the system for installing an aggregate pier in a soil matrix, the system further includes a control device at the distal end of the pipe. The control device is biasable between a first position and a second position. The control device limits the area of the first opening when the control device is biased to the first position relative to the area of the first opening when the control device is biased to the second position. The control device inhibits flow of the aggregate material through the first opening when the control device is in the first position.

In yet a further embodiment of the system for installing an aggregate pier in a soil matrix, the control device is mechanically biased between the first position and the second position by a rotation of the pipe about pipe axis in the soil matrix. The control device is biased to the first position when the pipe is rotated in the first direction about the pipe axis, thereby reducing the area of the first opening when the pipe is advanced into the soil matrix. The control device is biased to the second position when the pipe is rotated in the second direction about the pipe axis, thereby increasing the area of the first opening when the pipe is withdrawn from the soil matrix.

In yet a further embodiment of the system for installing an aggregate pier in a soil matrix, the system includes a door for affecting the area of the first opening. The door is proximate to the distal end of the pipe and at least partially rotatable about the pipe axis relative to the pipe. The door reduces the area of the first opening when the pipe is rotated in the first direction about the pipe axis. The door increases the area of the first opening when the pipe is rotated in the second direction about the pipe axis.

In yet a further embodiment of the system for installing an aggregate pier in a soil matrix, the control device comprises a plate connected to the door and fixed relative thereto. The plate extends distally therefrom so that the plate extends into the material below the distal end of the pipe. One or more of the soil matrix or an aggregate adjacent to plate generates a torque on the plate inhibits rotation of the plate and door when the pipe is rotated in one or more of the first direction and the second direction.

In yet a further embodiment of the system for installing an aggregate pier in a soil matrix, the control device comprises a first stop that inhibits rotation of the door relative to the pipe when the first opening is closed during rotation in the first direction. The control device further comprises a second stop that inhibits rotation of the door relative to the pipe when the first opening is open during rotation in the second direction.

In yet a further embodiment of the system for installing an aggregate pier in a soil matrix, the pipe comprises a plurality of sections that can be combined to increase the length of the pipe.

In yet a further embodiment of the system for installing an aggregate pier in a soil matrix, the compacting device is configured as a frustrum.

The present invention resides in yet another aspect in a method for installing an aggregate pier in a soil matrix. The method comprises the step of providing a pipe extending along a pipe axis between a distal and a proximal end, the pipe defining a bore extending therethrough along the pipe axis, the pipe having a first opening proximate to the distal end of the pipe, the first opening in fluid communication with the bore, the pipe having a second opening remote from the distal end, the second opening in fluid communication with the bore, the first opening, second opening, and bore in fluid communication such that an aggregate for forming the aggregate pier can pass through the second opening, the bore, and the first opening. The method further includes the step of providing a helix disposed on the pipe between the second opening and the distal end, the helix extending along at least a portion of an outer surface of the pipe, the helix extending radially from the pipe axis between the outer surface of the pipe to an outer edge of the helix, the helix configured such that when the helix is received in a soil matrix and the pipe is rotated in a first direction the helix imparts an axial force on the pipe in the direction of the distal end of the pipe thereby advancing the pipe into the soil matrix, and the helix further configured such that when the helix is received in a soil matrix and the pipe is rotated in the second direction the helix imparts an axial force on the pipe in the direction of the of the proximal end of the pipe thereby withdrawing the pipe out of the soil matrix. The method further includes the step of providing a compacting device fixed relative to the pipe and positioned between the distal end of the pipe and a bottom surface of the helix, the compacting device defining a compacting surface extending radially outward from outer surface of the pipe and extending upward in a direction of the proximal end of the pipe, the compacting surface configured to impart an axial force and a radial force on a material adjacent thereto when the pipe is rotated in the first direction. The method further includes the step of rotating the pipe in the first direction to the advance the pipe into the soil matrix until the distal end of the pipe reaches a depth of the aggregate pier. The method further includes the step of forming a portion of the aggregate pier by the following sequence of steps: (a) rotating the pipe in the second direction to withdraw a portion of the pipe from the soil matrix thereby creating a void below the distal end of the pipe; (b) filling the void with aggregate by passing the aggregate through the bore and the first opening and into the void; (c) rotating the pipe in the first direction so that the compacting device contacts the aggregate disposed in the void and imparts an axial and radial force thereto.

In yet another embodiment of the method for installing an aggregate pier in a soil matrix, the method further includes the steps of successively repeating the sequence of (a), (b), (c) to form the aggregate pier in the soil matrix.

In yet another embodiment of the method for installing an aggregate pier in a soil matrix, the method further includes the step of providing a control device at the distal end of the pipe, the control device biasable between a first position and a second position, wherein the control device limits the area of the first opening when the control device is biased to the first position relative to the area of the first opening when the control device is biased to the second position, wherein the control device inhibits flow of the aggregate material through the first opening when the control device is in the first position. The method further includes the step of biasing the control device to the first position when the pipe is rotated in the first direction. The method further includes the step of biasing the control device to the second position when the pipe is rotated in the second direction.

In yet another embodiment of the method for installing an aggregate pier in a soil matrix, the distal end of the pipe moves a distance W along the pipe axis during the step of (a) rotating in the second direction to withdraw pipe, wherein the distal end of the pipe moves a distance A along the pipe axis during the of step (c) of rotating in the first direction advance the pipe into the soil matrix. The ratio of W to A is greater than 1:1.

In yet another embodiment of the method for installing an aggregate pier in a soil matrix, the ratio of W to A is greater than 2:1.

In yet another embodiment of the method for installing an aggregate pier in a soil matrix, the ratio of W to A is 3:1.

In yet another embodiment of the method for installing an aggregate pier in a soil matrix, each sequence of steps (a), (b), (c) creates a lift in the aggregate pier.

In yet another embodiment of the method for installing an aggregate pier in a soil matrix, the compacting device is configured as a frustum.

BRIEF DESCRIPTION OF THE DRAWINGS

FIG. 9A is a partial cross-section of a distal end of a pipe with the cap shown in FIG. 9 received thereon wherein the door is biased open.

FIG. 9B is a partial cross-section of a distal end of a pipe with the cap shown in FIG. 9 received thereon wherein the door is biased open.

DETAILED DESCRIPTION

Figure 1:
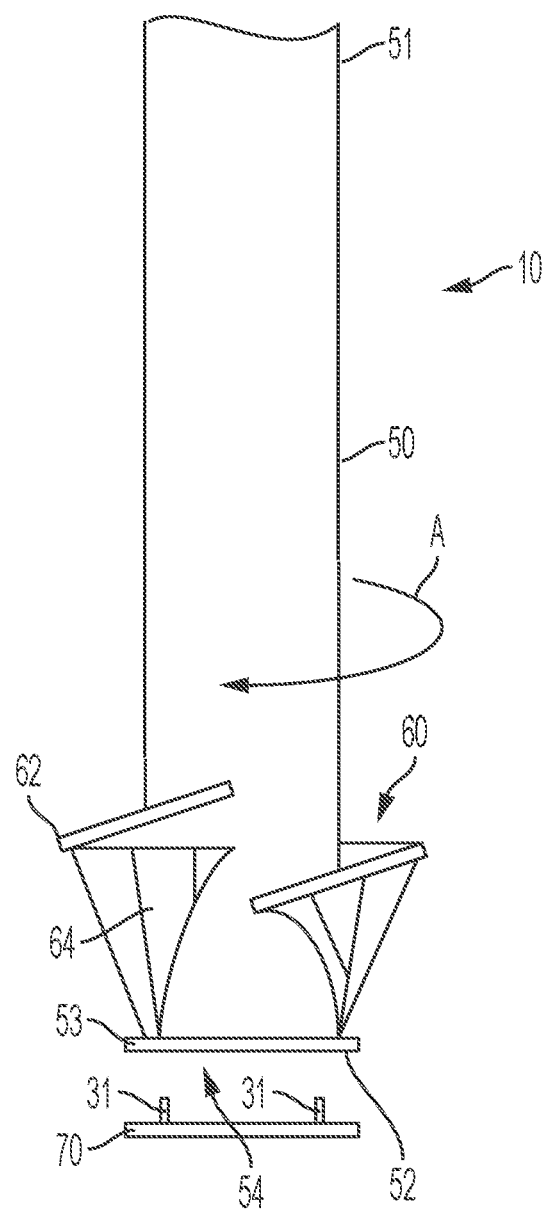
FIG. 1 illustrates a system for installing an aggregate pier in accordance with one embodiment of the present invention.

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

A purpose of the invention is to install aggregate piers or stone columns into the soil for purposes of ground improvements on construction projects. Ground improvement such as aggregate piers or stone columns are the creation of compacted aggregate in a column shape extended down to sufficient bearing soil material. The columns are installed to the desired depth to achieve the desired load bearing capacity at the top of the column. The columns are typically installed in a grid pattern and the building loads are dispersed to all or many of the columns.

The disclosed system and method of installing the columns in accordance with the present invention uses a torque/auger driver motor to "spin" the leading steel section into the soil to the desired depth. A person of ordinary skill in the art and familiar with this disclosure will understand that different systems for applying torque are known and may be employed with the present invention. For example, in one embodiment of the present invention, the torque driver is an auger toque earth drill that is available from Auger Torque. The term torque driver is used to generically refer to such systems that are known in the art for applying the required torque to the system. In one embodiment of the present invention, the torque driver is connected to the distal end of an excavator and is operatively connected to the hydraulic system therein. The torque driver is configured to generate a rotational force (torque) in a first direction about the longitudinal axis of the driver and alternatively in a second direction about the axis the second direction being opposite the first direction. The torque driver is operatively connected to a proximal end of a pipe having a helix at its distal end and it rotates the pipe into the soil without withdrawing soil matrix. It should be understood that the present invention is not limited in this regard and that other types of rotation/torque drives may be used in accordance with the present invention.

In reference to FIG. 1, a system 10 for installing an aggregate pier in accordance with one embodiment of the present invention is shown. The system 10 includes a pipe 50 having a generally convex arcuate outer surface. The pipe 50 extends between a distal end 52 and a proximal end 51. The pipe 50 is configured to be rotated into a soil matrix such that the distal end 52 of the pipe is proximate to the leading edge and the proximal end 51 of the pipe is at the trailing edge.

Figure 12:
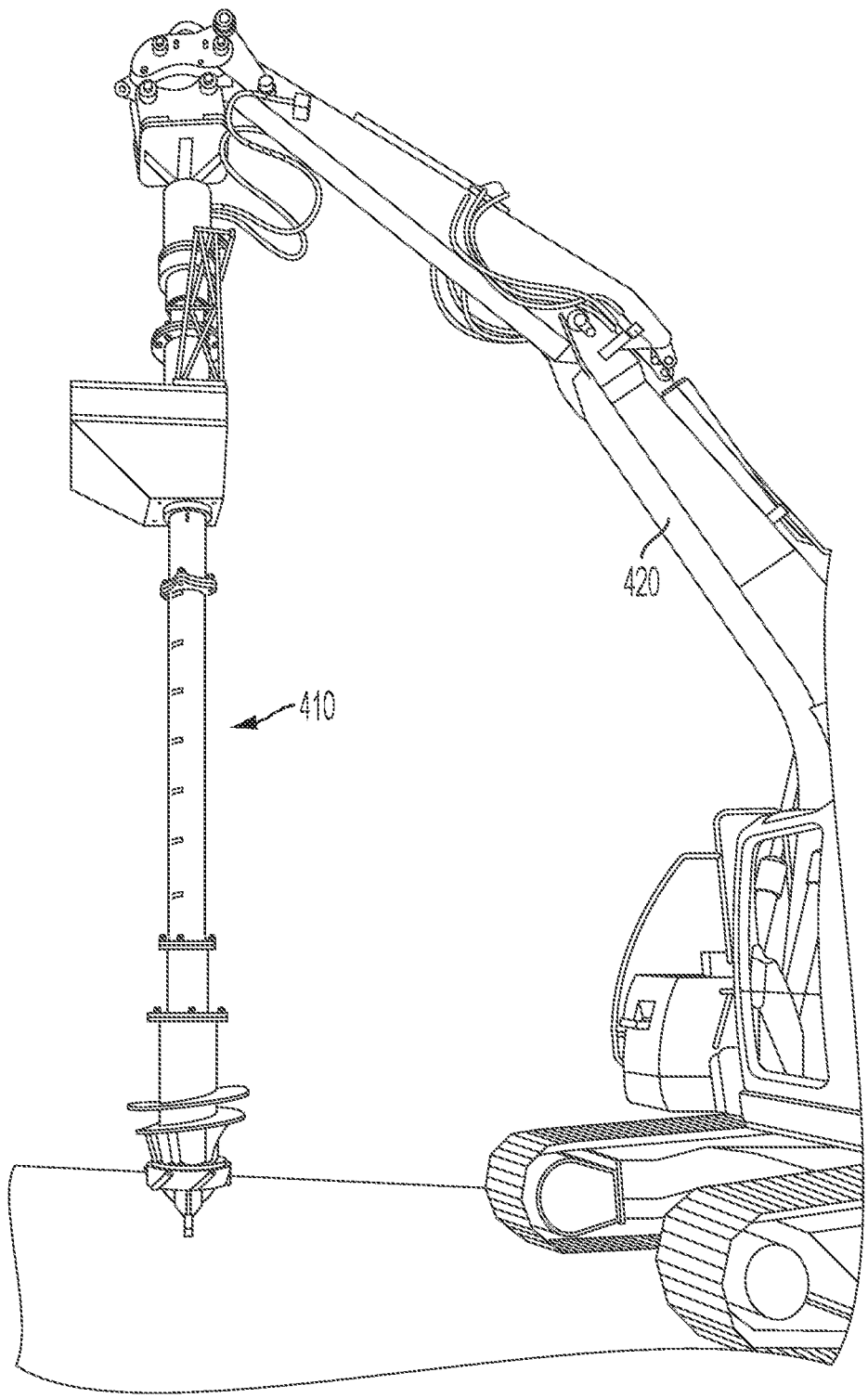
FIG. 12 is a view of a system for installing an aggregate pier in accordance with one embodiment of the present invention.
Figure 13A:
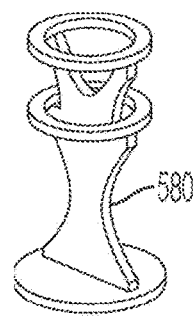
FIGS. 13A-13D are different views of a system for installing an aggregate pier in accordance with one embodiment of the present invention.
Figure 13B:
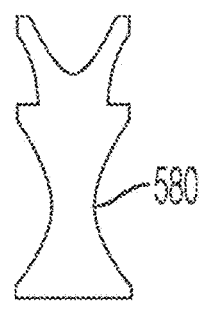
Figure 13C:
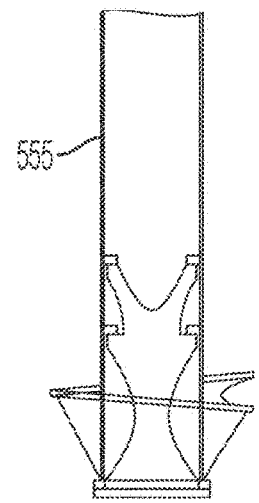
Figure 13D:
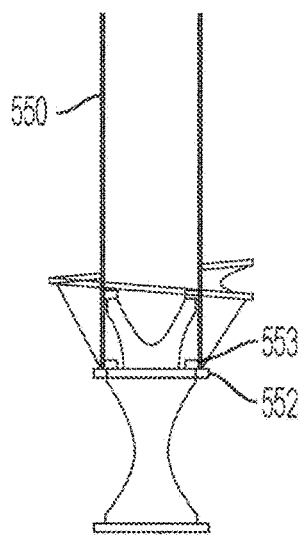

The pipe 50 may comprise one section, as shown in FIG. 1. In the alternative, the pipe may include a plurality of sections. In such configurations, the distal end 52 of the pipe 50 is advanced into the soil matrix by a rotation thereof about an axis of the pipe 50 extending between the distal end 52 and the proximal end 51. As the proximal end 51 of the pipe 50 nears the surface of the soil matrix, a second pipe may be connected to the proximal end 51 of the first pipe such that the first and second pipe are axially fixed and rotatably fixed. In this manner, rotation of the pipe, and resultant further advancement thereof into the soil matrix, may continue. In this manner, multiple sections of pipe can be used. In yet other embodiments of the present invention, multiple sections of the pipe may be assembled prior to use of the system. Such a system, for example, is illustrated in FIG. 12. In reference to the embodiment disclosed in the figures, a single section pipe is shown for the purpose of disclosing embodiments in accordance with the present invention. It should be understood that the present invention may be practiced with a single section of pipe and the present invention may be practiced using multiple sections of pipe.

In reference to the embodiment disclose in the FIG. 1, the pipe 50 is illustrated having a circular cross section in a plane perpendicular to the pipe axis and circular cross section is uniform along the axis of the pipe. It will be understood to a person having ordinary skill in the art and being familiar with this disclosure that a pipe having different shaped cross sections may be used to practice the present invention, and that such cross sections need not be uniform along the axis. It should be further understood that although the term "pipe" is used in the present disclosure, the term is not intended to limit the scope of the present invention to a traditional pipe that may be used in the plumbing business. A person of ordinary skill in the art and familiar with the disclosure will understand that any substantially rigid elongate structure having a first opening proximate to one end and a second opening remote therefrom and a bore connecting the two openings.

In reference to FIG. 1, the pipe 50 defines a bore extending along the axis thereof. The bore is in fluid communication with a first opening 54 at the distal end 52 and a second opening at the proximal end 51. In the embodiment disclosed in FIG. 1, the pipe 50 defines a concave arcuate interior surface which defines a periphery of the bore in a cross-sectional plane being perpendicular to the longitudinal axis. In the embodiment disclosed, the bore has a circular cross section having a constant radius in a cross section thereof. In the embodiment disclosed, the cross section defined by the periphery is constant along the length of the pipe, although the present invention is not limited in this regard. The pipe defines a thickness between the outside surface thereof and the inside surface of the bore.

In the embodiment disclosed in the FIGS., the pipe 50 includes a flange 53 at the distal end 52. The outside diameter of the flange 53 is greater than the outside diameter of the pipe 52 at the distal end thereof. Although a flange 53 is disclosed in the embodiment shown in FIG. 1, the present invention is not limited in this regard and a person of ordinary skill in the art and familiar with the disclosure will understand that invention can be practice without a flange.

Figure 4A:
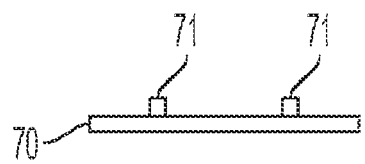
FIG. 4A is a view front view of an end caps in accordance with one embodiment of the present invention.
Figure 4B:
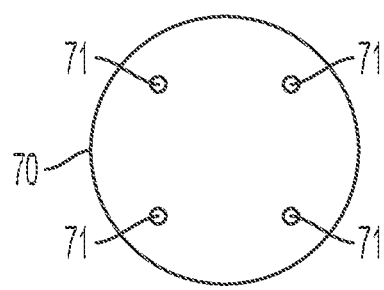
FIG. 4B is a top view of the end cap shown in FIG. 4A.

In the embodiment disclosed in FIG. 1, the distal end 52 of the pipe 50 is configured to engage with a cap 70 that is selectively attachable to one or more of the distal end 52 of the pipe 50 and the flange 53. In the embodiment disclosed in FIG. 1, the cap 70 is generally circular in a cross section and has a diameter greater than an inside diameter of the pipe 50. The cap 70 is further illustrated in FIGS. 4A and 4B. The cap 70 is configured so that it remains fixed to the distal end (leading edge) 52 of the pipe 50 as the pipe is advanced in the soil matrix. The cap 70 disengages from the distal end 52 of the pipe 50 when the pipe is rotated out of the soil matrix. In this manner, the cap 70 remains at the bottom of the aggregate pier that is formed by the system 10.

The method and hardware for fixing the cap 70 to the distal end 52 of the pipe may vary 51. In the embodiment disclosed in FIG. 1., the cap defines several protrusions 71 extending from a surface thereof. One of more of the flange 53 and the distal end 52 of the pipe 50 define recesses configured to receive the protrusions 71. In this manner, the cap 70 is attached to the distal end 52 of the pipe 50. In this configuration, the cap 70 is rotatably fixed relative to the pipe 50 about the axis of the pipe 50. Furthermore, the cap 70 abuts the distal end 52 of the pipe 50, but it is not axially fixed thereto. During rotational insertion of the system, a compression force is applied to the cap 70 as it is sandwiched between the leading edge (or distal end) of the pipe 50 that is rotatably advanced into the soil matrix. The connection between the protrusions 71 and the recesses fix the cap 70 to the leading end of the pipe 50 about the axis of rotation. In this manner, the cap 70 will rotate with the pipe 50 during the rotational advancement. After the distal end 52 of the pipe 50 achieves a desired depth in the soil matrix, the pipe 50 may be reversed using an opposite rotation. As the pipe 50 is backed out of the soil matrix in this manner the cap 70 may rotate with the pipe while the protrusions 71 remain engaged with the recesses, however the cap will eventually axially separate from the distal end 52 of the pipe 50 because the soil matrix is no longer generating a compression force sandwiching the cap 70 to the distal end 52 of the pipe 50.

As the pipe 50 is reversed out further, the protrusions disengage 71 from the recesses in the one or more of the distal end 52 of the pipe 50 and the flange 53 and the cap 70 separates from the pipe 50 and remains at the bottom of the aggregate pier that is to be formed in the prepared column of the matrix. It should be understood that the number of protrusions may vary. In other embodiments the length of the protrusions varies between different caps. In use with some matrices, it may be important to provide a greater height for the protrusion to allow for an operator to reverse the pipe for one or more rotations prior to reaching the desired depth as this may be necessary to rotatably work through certain matrices.

It should be understood that the present invention is not limited in this regard that different systems may be used at the distal end 52 of the pipe 50 to facilitate one or more of the position of the insertion of the distal end into the soil matrix, and the flow rate of aggregate material through the opening 54 of the distal end 52 of the pipe 50. Different embodiments, for example, are disclosed in FIGS. 4C-4D, FIGS. 6-12, and FIGS. 13A-12D.

As will be discussed in further detail below, after the pipe attains the desired depth in the matrix, aggregate is introduced into the bore at an opening 56 in the pipe 50 proximate to the proximal end 51 and pulled down in the pipe 50 by the force of gravity to the first opening 54 at the distal end 52 of the pipe 50. It should be noted that the aggregate pier may be installed perpendicular to the building surface, although the present invention is not limited in this regard. For example, the aggregate pier may be installed at an angle relative to the building surface. The aggregate that is introduced into the pipe accumulates at a bottom thereof. The weight of the aggregate generates a downward force on the cap. This downward force further assists in the selectively disengaging the cap from the distal end of the pipe.

Figure 4C:
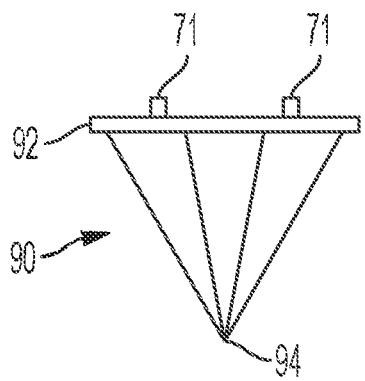
FIG. 4C is a view front view of an end caps in accordance with one embodiment of the present invention.
Figure 4D:
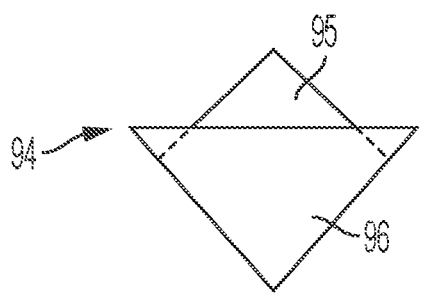
FIG. 4D is a view front view of an end caps in accordance with one embodiment of the present invention.

In reference to FIGS. 4C and 4D, alternative embodiments of end caps are illustrated. In reference to FIG. 4C, the end cap 90 comprises a plate 92. The plate 92 includes several protrusions 91 protruding from a surface thereof. The opposite side of the plate 92 is configured as a pyramid that ends in a distal point 94. Use of a point in this manner facilitate advancement of the system into the soil matrix. In reference to FIG. 4D, the end cap is also configured as a pyramid 96. This embodiment, however, does not include protrusions. Rather, it includes a cone like shape facing the opposite direction that is configured to be partially received in the distal end of the pipe via the first opening 54. I While an above described embodiments of selectively attaching the cap to the pipe is disclosed, the present invention is not limited in this regard and other configurations may be employed. For example, the number of protrusions may vary. In another embodiment, the cap may include an axially extending collar receivable in the pipe. In some variations of this embodiment, the collar may include one or more protrusions extending radially outward from the collar. The inside surface of the pipe may include one or more channels configured to receive the radially extending protrusions. The channel may, for example, extend axially from the distal end of the pipe and then along a portion of the circumference of the pipe in a plane perpendicular to the axis. This configuration may resemble, for example, a Storz type lock that is known in the art. In yet further embodiments of the present invention, the cap may be selectively attached to the pipe via a mechanical connection biasable between a locked position wherein the cap is rotatably and/or axially fixed relative to the distal end of the pipe and a second configuration wherein the cap is not axially and/or rotatably fixed relative to the distal end of the pipe. In some embodiments, the mechanical connection is actuatable from the proximal end of the pipe via a mechanical actuator. In other embodiments, the mechanical connection is actuatable via an electronic system that may have one or more of a wireless and wired connection.

Figure 2:
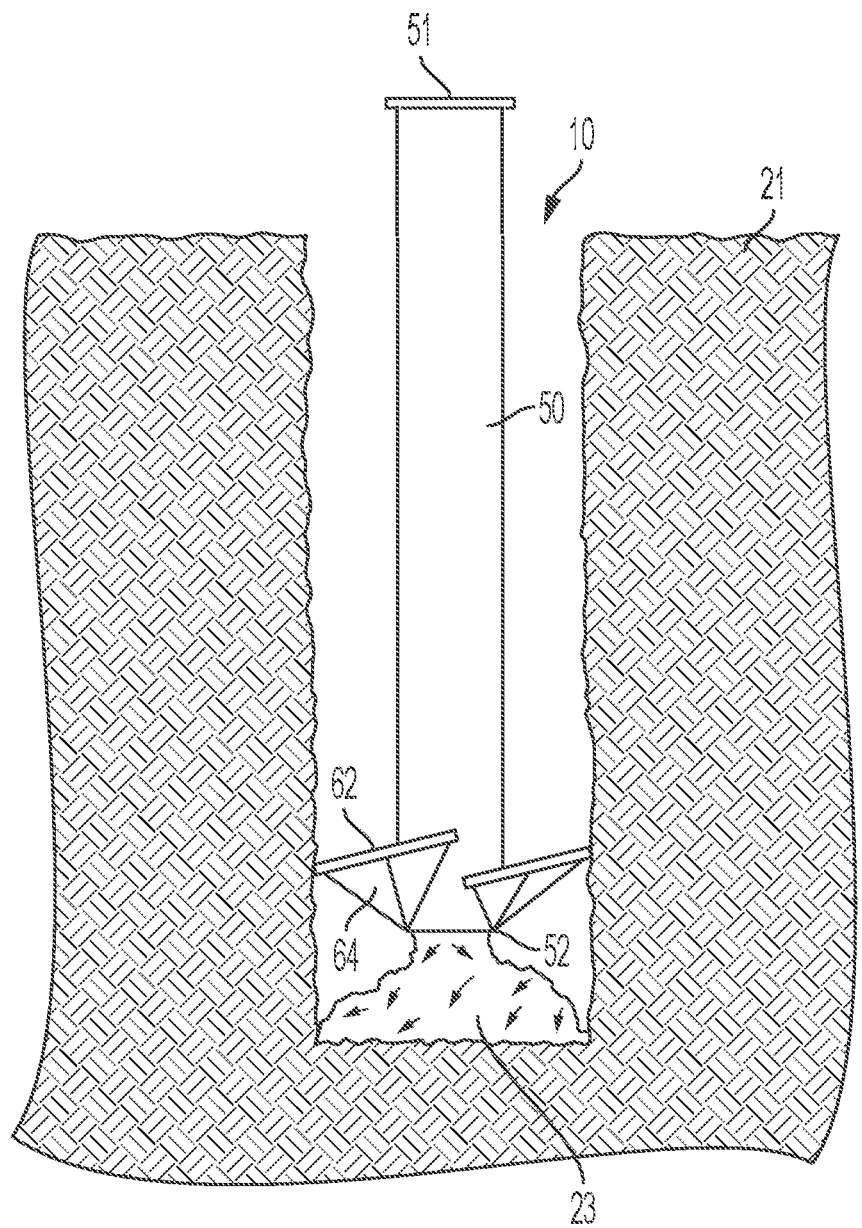
FIG. 2 is a view of the system in FIG. 1.
Figure 3:
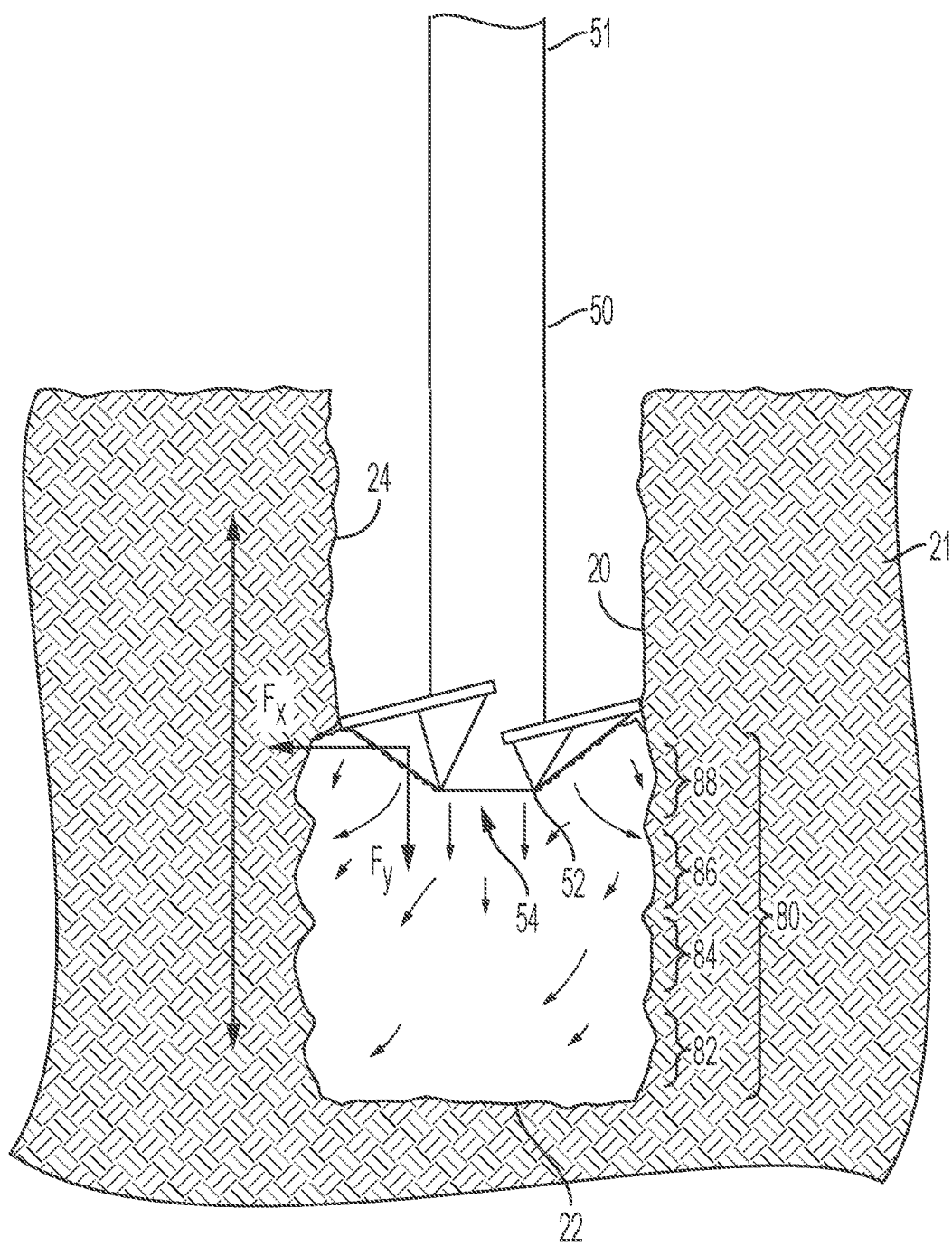
FIG. 3 is a view of the system in FIG. 1, wherein the system is installing lifts in the aggregate pier.

The system comprises a helix 62 disposed proximate to the distal end 52 of the pipe 50. The helix 62 is fixed on the outer surface of the pipe and extends radially therefrom. The helix 62 is configured to rotate through the soil matrix 21 (illustrated in FIGS. 2 and 3). In the embodiment shown in the FIGS. 1-3 the helix 62 extends around the circumference of the pipe 50 for about one pitch length. The helix 62 is generally planer and defines the helix pattern. The helix 62 extends from the outside surface radially toward an outer edge. The helix 62 is configured so that a rotation of the pipe 50 about the axis of the pipe in the direction A causes the pipe to screw into the soil matrix 21. In this manner and through rotation thereof, the pipe 50 is inserted into the soil matrix 21 to the desired depth. The radially extent of the helical surface relative to the radius of the pipe may be varied depending on the matrix conditions and the desired load conditions for the aggregate pier. The helix is configured so that it does not remove material from the matrix during the pipe insertion process. It should be understood that although material from the matrix is not removed, the material is compacted laterally and radially to create a void in the ground as is illustrated in FIGS. 2 and 3. As the helix and pipe are rotated into the matrix, matrix material displaced by the volume of the pipe is compressed and displaced radially outwards. In this manner, the system and method of forming aggregate columns in accordance with the present invention reduces the expense and time associated with removal of fill. It will be understood by a person of skill in the art and being familiar with this disclosure, that the present invention may be practiced wherein some basis for matrix removal is provided for.

In reference to FIG. 1, the system includes a compacting device 64, configured as a frustum, disposed proximate to the distal end of the pipe. In the embodiment disclosed, the system includes a conical frustum 64 formed from plates welded between one or more of the outer surface of the pipe and the flange and the bottom surface of the helix. In the embodiment disclosed in the FIGS, the base of the frustum is adjacent to the bottom side of the helix and the apex side of the frustum extends to the distal end of the pipe. The present invention is not limited in this regard, and it may be practiced, for example, with the compacting device 64 between the distal end and the helix but not directly adjacent to either. The frustum may be a conical frustum, pyramid frustum, or a trapezoidal frustum. In the embodiment disclosed in FIG. 1, the frustum comprises a truncated cone. It should be understood that the present invention is not limited in this regard and that different shapes and configurations may be employed in accordance with the present invention. The frustum is formed by welding sections between the periphery of the helix and the outer surface of the pipe proximate to the distal end thereof.

In reference to FIGS. 2 and 3, during rotational insertion of the pipe 50 into the soil matrix 21, the downward surface of the frustum 64 generates a compacting force on the matrix material 21. The angle of the frustum causes the force to have a downward or vertical component and a radially outward component. In a similar fashion, and as will be further described below, the downward frustum generates radially outward force $F_x$ and a down force $F_y$ on aggregate added to the system through the pipe bore and disposed at the distal end thereof.

After the pipe attains a desired depth, aggregate material 23 is introduced into the system 10 through an opening 51 in the pipe 50 proximate to the proximal end. A number of types of aggregate material can be utilized in the practice of the process including crushed stone of many types from quarries, or recycled, crushed concrete. Additives may include water, dry cement, or grout such as water-cement sand-grout, fly-ash, hydrated lime or quicklime, or any other additive may be utilized which may improve the load capacity or engineering characteristics of the formed aggregate pier. Combinations of these materials may also be utilized in the process and system in accordance with the present invention.

Figure 5:
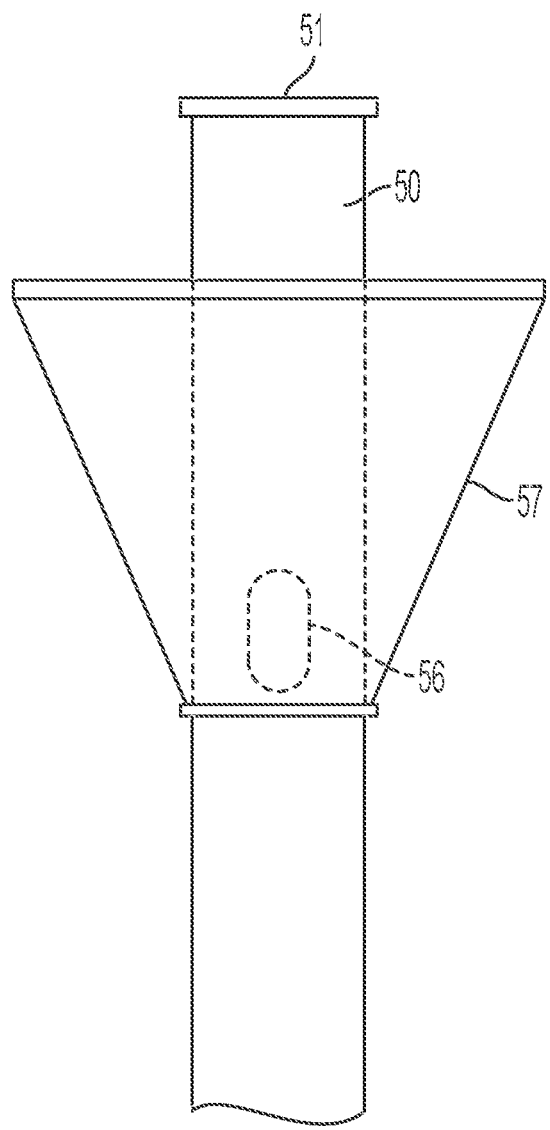
FIG. 5 illustrates a hopper for use with the present invention.

In reference to FIG. 5, a portion of the pipe 50 is shown wherein a hopper 57 for receiving aggregate is radially received around the pipe 50 proximate to the proximal end thereof. The pipe is received through a collar in the bottom of the hopper 64 and is rotatable relative thereto. In the embodiment disclosed, the hopper 64 is axially fixed relative to the pipe 50. The pipe 50 defines an opening 56 in the surface thereof that is in communication with bore of the pipe 50. In the embodiment disclosed, the opening 56 of the pipe is inside the bed of the hopper 65 and towards a bottom thereof to facilitate the flow of aggregate from the hopper to the pipe.

When the rotation of the pipe has caused it to reach a desired depth in the matrix, the hopper is affixed to the pipe and aggregate is added to the bed of the hopper. In other embodiments of the present invention, the hopper is axially fixed relative to the pipe and is therefore rotated during the insertion period. An example of this embodiment is shown, for example, in FIG. 12. The hopper may be rotatable relative to the pipe, or alternatively, the hopper may be rotatably fixed relative to the pipe. The aggregate is gravity fed to the bottom of the hopper 64 and into the pipe 50 through the hole 56. In one embodiment of the invention, the bore of the pipe is filled with aggregate in this manner. In addition, the bed of the hopper is also filled with aggregate. The additional aggregate will flow through system during the compacting phase as the counter rotations of the pipe, described further below, cause the aggregate to compact and to expand outside the diameter of the pipe. In some cases, the expansion may be horizontally outside the edge of the helix. In this manner, there is additional aggregate in the hopper that can be used and fed into the system. As the pipe is backed out of the system, the height of the hopper increases off the ground. Additional gravel or aggregate may be added to the system by adding the aggregate to the hopper by a bucket loader or other similar equipment. In some embodiments of the present invention, each section of the pipe is configured with a hole in the surface of the pipe so that the hopper can be connected to each section of pipe as it is backed out of the matrix. In some embodiments, the hole is biasable between and open and closed configuration. In other embodiments, the hole remains open.

The proximal end of the pipe, or each section thereof, is connected to a torque driver. In reference to FIG. 12, a torque driver 159 in accordance with one embodiment of the present invention is illustrated. As discussed above, the torque driver 159 is connected to the distal end of an excavator 201 and is operatively connected to the hydraulic system therein. The torque driver 159 is configured to generate rotation force in a first direction about the longitudinal axis of the driver and alternatively in a second direction about the axis the second direction being opposite the first direction.

During installation, the removable cap is placed on the end of the leading section as it is placed upright on the ground surface before advancing into the soil. The pipe is advanced vertically by rotation into the soil. The additional sections of the pipe may be added to the back of the leading section to add length as required to reach the desired depth. The hopper is attached to the top section once the desired depth is reached. Alternatively, a system is used in which it is preassemble prior to use (see FIG. 12). The hopper is filled with aggregate, which flows down to the bottom of the hollow pipe, to the tip of the leading section where it rests on the removable cap. Once the stone is in place, the pipe sections are rotated in a reverse motion and "backed out" of the ground. The removable cap stays in place at the bottom of the build column and the stone gravity feeds out of the first opening in the distal end of the pipe. The overall system is backed out of the ground a certain distance via a counter rotation and then screwed back in a certain distance to compact the aggregate that has filled into the void. The operator may employ successive forward rotations and counter rotations to compact the gravel to a desired diameter and hardness. This process is performed in "lifts" as the pipe system is removed out of the ground. In reference to FIG. 3, this process creates lifts in the compacted aggregate column indicated by the bulging aggregate 82, 84, 86, 88. The diameter of the widths may be varied by the type of aggregate, the amount of compression rotation, the force of the compression rotation, the speed of the rotation, and the torque force generate through the rotation. In this manner, it is possible to use the system and method to achieve aggregate columns rated for different loads. The size and shape of the frustum at the bottom of the pipe is selected in a manner that will also affect the aggregate pier. For example, a steeper frustum will generate more radial force causing greater spread. A shallower frustum may generate more downward compacting force on the aggregate.

In reference to FIGS. 2 and 3, the drawings shown a cavity above the helix and on either side of the pipe. It will be understood by a person or ordinary skill in the art and familiar with this disclosure that the matrix material is retained in this cavity during the installation process. The cavity is only illustrated for the purpose of indicating the general position of the aggregate column to be disposed therein. The cavity above the helix remains filled with the soil matrix.

Aggregate is added as needed to keep a continuous flow out of the bottom of the leading section. Once the pipe sections are completely removed, a cylindrical aggregate column is left in the ground to the desired depth of bearing.

In one embodiment of the present invention, the pipe may be filled with grout or low permeability grout prior to withdrawal. The use of grout in association with the aggregate makes the ground improvement capable of withstanding additional force. In yet further embodiments of the present invention, the grout may be included on the outside of the pipe. They grout may be introduced through pressurized means or a narrow cavity formed between the matrix and the pipe.

In yet other embodiments of the present invention, a rigid member may be introduced into the bore of the pipe. The member extends the length of the bore. In some embodiments the member is fixed to the cap. In this manner, it is possible to retain the member in position while the aggregate is inserted therein. The rigid member, for example may be a steel element such as rebar.

In some embodiments of the present invention a mechanism to assist the flow of aggregate to the bottom of the pipe is provided. For example, in some embodiments, a vibration source is added to one or more of the hopper and the pipe to transfer high frequency vibration to the system facilitate the release of compacted aggregate in the system.

In reference to FIG. 4, several different embodiments of removable caps are shown. In a first option, the plate is on a distal end. In a second embodiment the leading edge of the plate defines a conical frustum that extends to an apex. This embodiment, for example, may be selected for use with a denser soil material. In another embodiment, the plate defines a conical frustum on the leading-edge surface and on the surface opposite thereto. The second frustum extends into the bore of the pipe.

Figure 6:
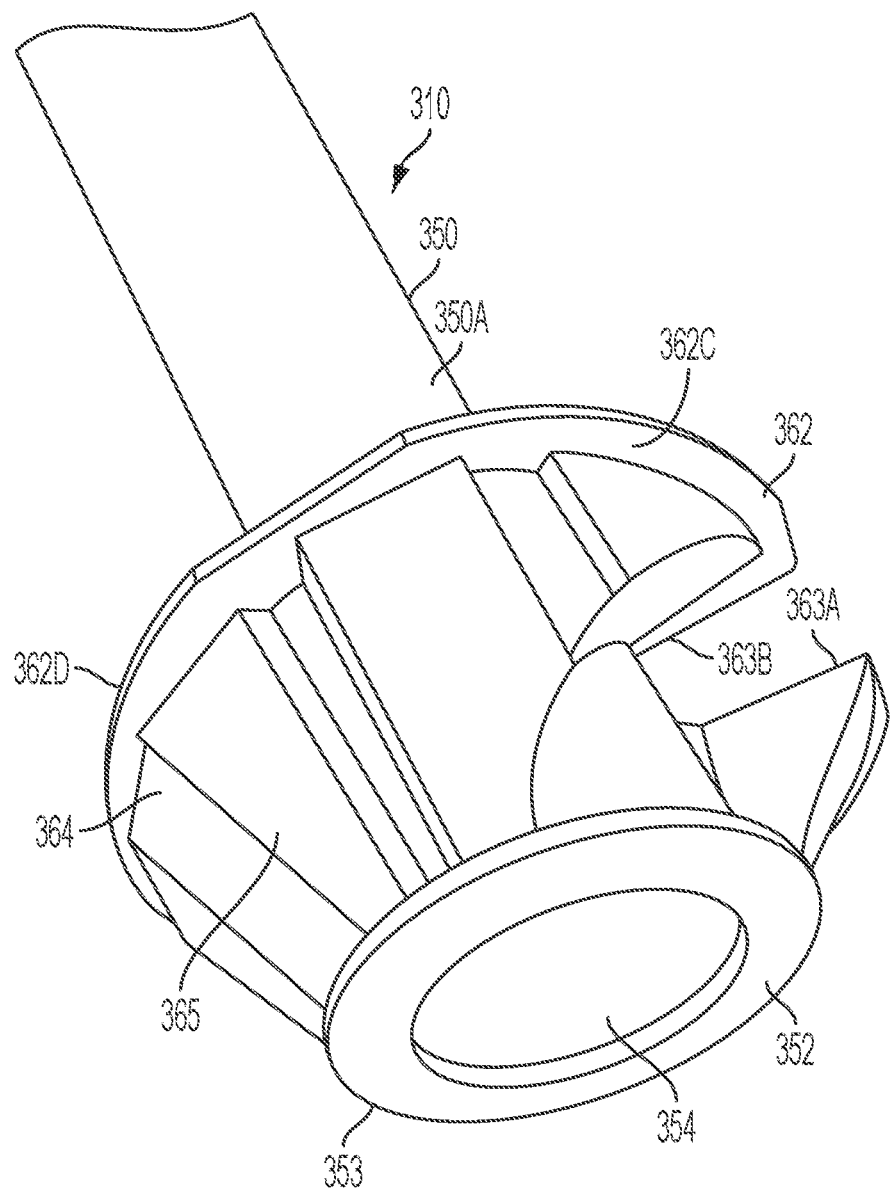
FIG. 6 is a view of a distal end of a pipe in accordance with one embodiment of the present invention.

In reference to FIG. 6, a distal end 352 of a pipe 350 of one embodiment of a system 310 for installing an aggregate pier in a soil matrix is shown. The system 310 includes a pipe 350 extending along a pipe axis between a distal end 352 and a proximal end (not shown). The pipe 310 defines a bore extending therethrough along the pipe axis, the pipe 310 has a first opening proximate 354 to the distal end 352 of the pipe, the first opening in fluid communication with the bore. The pipe has a second opening (not shown) remote from the distal end. The second opening is in fluid communication with the bore. The first opening 354, second opening, and bore are in fluid communication such that an aggregate for forming the aggregate pier can pass through the second opening, the bore, and the first opening 354.

An area of the pipe remote from the distal end of the pipe configured to interface with a torque driver for rotating the pipe about the pipe axis. This is not shown in FIG. 6. The pipe is rotatable in a first direction about the pipe axis. The pipe is rotatable in a second direction about the pipe axis, the second direction being opposite the first direction.

A helix 364 is disposed on the pipe 350 between the second opening and the distal end 352. The helix 362 extends along at least a portion of an outer surface 350A of the pipe 350, the helix 362 extends radially from the pipe axis between the outer surface of the pipe 350A to an outer edge of the helix 362D. The helix is configured such that when the helix 362 is received in a soil matrix and the pipe 310 is rotated in the first direction the helix 362 imparts an axial force on the pipe 350 in the direction of the distal end 362 of the pipe thereby advancing the pipe into the soil matrix. The helix 362 is further configured such that when the helix 362 is received in a soil matrix and the pipe 350 is rotated in the second direction the helix imparts an axial force on the pipe in the direction of the proximal end of the pipe thereby withdrawing the pipe from the soil matrix.

In further reference to FIG. 6, the system 310 comprises a compacting device 364 fixed relative to the pipe 350 and positioned between the distal end 362 of the pipe and a bottom surface 362C of the helix 362. The compacting device 364 defining a compacting surface 365 extending radially outward from the outer surface of the pipe and extending upward in a direction of the proximal end of the pipe. The compacting surface configured to impart an axial force and a radial force on soil matrix adjacent thereto when the pipe is rotated in the first direction. This is illustrated in FIG. 3. In the embodiment shown in FIG. 6. In some embodiments of the present invention, as shown in FIG. 6, the helix 364 extends along the outer surface of the pipe one pitch of the helix. That is the helix extends approximately once around the periphery of the pipe 350. A person of ordinary skill and familiar with the disclosure will understand that the number of pitches and the pitch length may vary.

In the embodiment shown in FIG. 6, the compacting device 364 extends substantially around the outside surface of the pipe 350 in a plane substantially perpendicular to the pipe axis. The compacting device is substantially commensurate in scope with the beginning 363A and end 363B of the helix.

Figure 7:
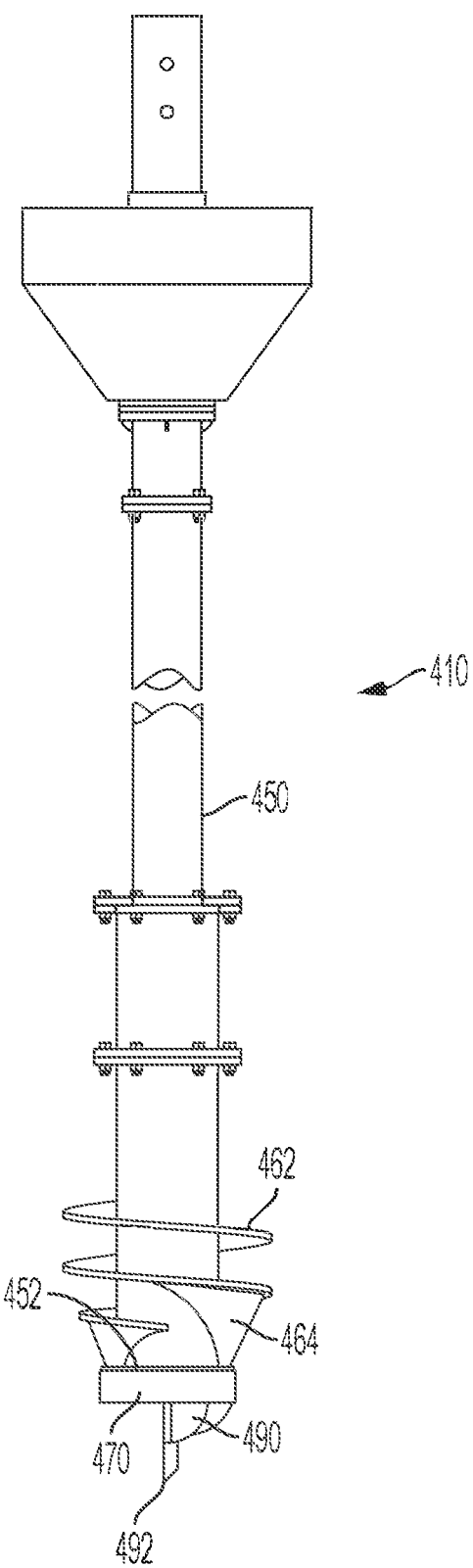
FIG. 7 is a view of a system for installing an aggregate pier in accordance with one embodiment of the present invention

In reference to FIG. 7, another embodiment of a system 410 for installing an aggregate pier is shown. The system 410 includes an end cap that is configured as a control device 470 at the distal end 452 of the pipe 450. The control device 470 is biasable between a first position and a second position, wherein the control device limits the area of the first opening when the control device 470 is biased to the first position relative to the area of the first opening when the control device is biased to the second position. The control device inhibits flow of the aggregate material through the first opening when the control device is in the first position.

Figure 8:
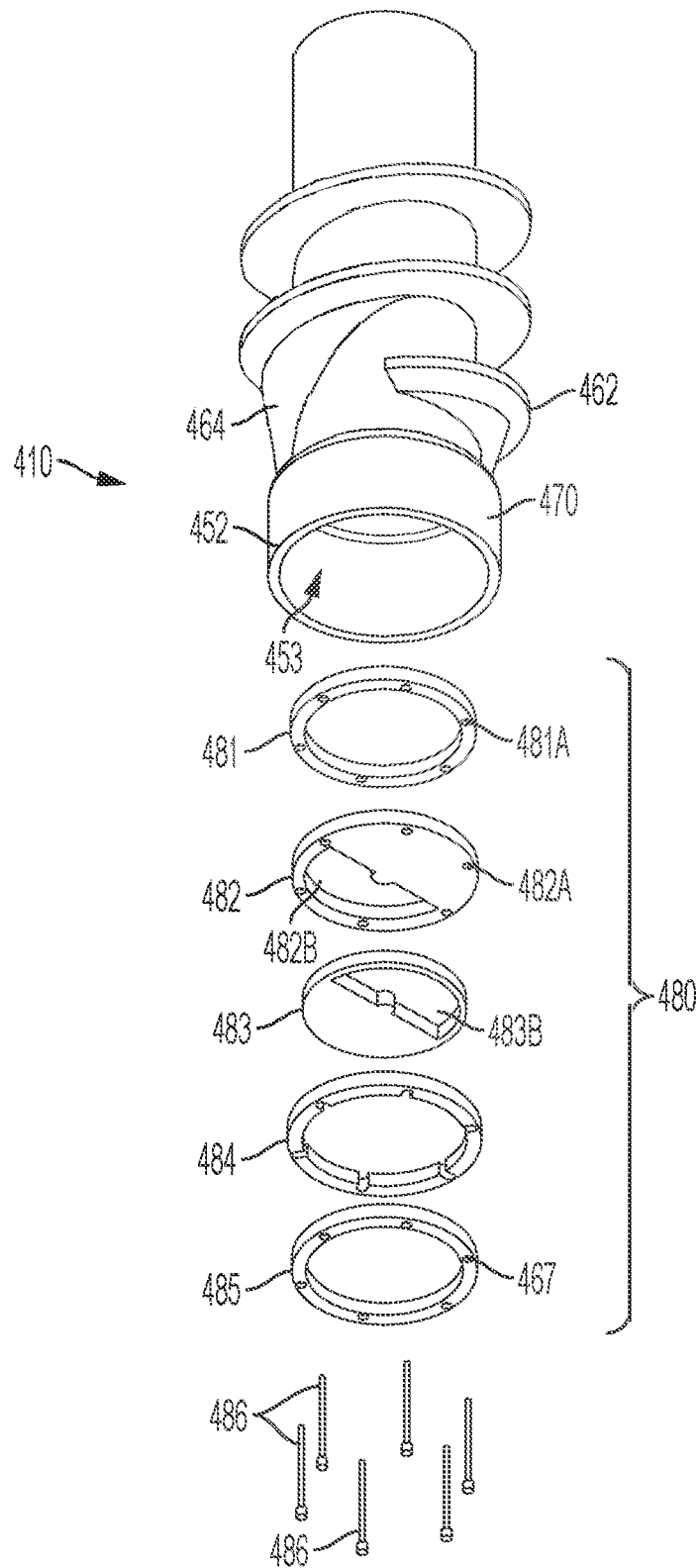
FIG. 8 is view of a portion of the system for installing an aggregate pier shown in FIG. 7 and further showing an exploded view of the end piece of a drilling cap in accordance with one embodiment of the present invention.

In reference to FIG. 8, a partial exploded view of one embodiment of a control device is shown. The control device is mechanically biased between the first position and the second position by a rotation of the pipe about pipe axis in the soil matrix. The control device is biased to the first position when the pipe is rotated in the first direction about the pipe axis, thereby reducing the area of the first opening when the pipe is advanced into the soil matrix. The control device is biased to the second position when the pipe is rotated in the second direction about the pipe axis, thereby increasing the area of the first opening when the pipe is withdrawn from the soil matrix.

In the embodiment disclose, the control device 480 comprises a door 483 for affecting the area of the first opening 454. The door is proximate to the distal end of the pipe and at least partially rotatable about the pipe axis relative to the pipe. The door reduces the area of the first opening when the pipe is rotated in the first direction about the pipe axis. The door is moved increase the area of the first opening when the pipe is rotated in the second direction about the pipe axis. In reference to FIG. 8, the door 483 comprises a plate 490 connected to the door 483 and fixed relative thereto. The plate 490 extending distally therefrom to a plate distal end 492. One or more of the soil matrix or an aggregate adjacent to plate 490 generates a torque on the plate to inhibit rotation of the plate 490 and door 483 when the pipe is rotated in one or more of the first direction and the second direction. In some embodiments, the control device comprises a first stop that inhibits rotation of the door relative to the pipe when the first opening is closed during rotation in the first direction. In this manner, the first opening will remain closed as the pipe continues to rotation in the first direction about the first axis. In this configuration, the pipe and the door will continue to rotate together in the first direction. The system includes a second stop that inhibits rotation of the door relative to the pipe when the first opening is open during rotation in the second direction. That is, once the door is open and the first opening is in fluid communication with the area outside the pipe, the door remains open as the pipe continues to rotate in the second direction. This allows for the free flow of aggregate through the first open as the pipe is withdrawn from the matrix, thereby allowing aggregate to flow into and fill the void below. The pipe is then rotated in the first direction wherein the resistance between the aggregate and the plate 490 causes the door to rotate to the closed position as the pipe is further advanced into the aggregate that has filled the void. Closing of the door prevents aggregate from becoming clogged in the bore of the pipe during the crushing step. It further provides additional surface to contact the aggregate and apply force thereto for forming the pier. The pipe is further rotated in the first direction, wherein the helix creates a downward force on the pipe, thereby advanced the pipe further in the matrix. The contact device applies a force pressure on the aggregate in both the axial and radial direction dues to the general frustum configuration of the crushing device.

This sequence is iterated until the aggregate pier is fully formed. The sequence includes the steps of: (a) rotating the pipe in the second direction to withdraw a portion of the pipe from the soil matrix thereby creating a void below the distal end of the pipe; (b) filling the void with aggregate by passing the aggregate through the bore and the first opening and into the void; (c) rotating the pipe in the first direction so that the compacting device contacts the aggregate disposed in the void and imparts an axial and radial force thereto.

During this process, the distal end of the pipe moves a distance W along the pipe axis during the step of (a) rotating in the second direction to withdraw pipe. The distal end of the pipe moves a distance A along the pipe axis during the of step (c) of rotating in the first direction advance the pipe into the soil matrix. As the aggregate pier is formed, the ratio of W to A is greater than 1:1. That is, after the pipe is fully advanced into the matrix during, the subsequent distance of the withdrawal of the pipe W is greater than the subsequent advancement A in each iteration. In this manner, the aggregate column is formed in the matrix. In one embodiment of the present invention, the ratio of W to A is greater than 2:1. In yet a further embodiment of the present invention, the ratio of W to A is 3:1. The inventors have discovered that this approximate ratio results in aggregate piers that are structurally formed to satisfy standard tests for load support. That is, after the pipe achieves the column dept, it is rotated in the second direction to withdraw the pipe approximately three feet. The void below the pipe is filled with aggregate during this process. Then the pipe is rotated in the first direction so that it is advanced one foot thereby crushing the aggregate and forming part of the column. It will be understood to a person of skill in the art and familiar with this disclosure that the ration of W to A will vary based on different factors, such as the diameter of the helix, the pitch of the helix, the design of the compacting device, the contents of the soil matrix, the selected aggregate, and the desired load conditions for the pier, among other conditions.

In references to FIGS. 7-11, one embodiment of wherein the end cap comprises a control device 480 scheme is disclosed, wherein the opening at the distal end of the pipe is biasable between an open position and a closed position via the end cap. When the control device is biased to the first position, the distal end or first opening of the pipe is closed and aggregate cannot pass through the distal end of the pipe. In this manner, the pipe can be rotated in the first direction, thereby advancing the system into the soil matrix and forming a lift. The bottom of the control device is closed in this configuration, thereby providing a compacting surface that extends perpendicular to the longitudinal axis of the pipe. When the control device is biased toward the open position, an opening is provided in the distal end of the pipe. In this manner, aggregate can be fed through the pipe and out the distal end thereof to create the aggregate pier. This may occur, for example, when the pipe is rotated in the second direction.

In reference to FIG. 8, a partial exploded view of one embodiment of a control device 48. in accordance with the present invention is disclosed. The portions of the system 480 are received in a cylindrical body 470. In one embodiment of the present invention, the layers disclosed in FIG. 8 are received in the distal end 454 of the bore 483 defined by the pipe. In another embodiment, the layers are received in a cylindrical element 470 that has generally the same diameter as the distal end of the pipe. The cylindrical element is axially fixed to the distal end of the pipe. For example, in some embodiments, the cylindrical element is welded to the distal end of the pipe.

The end cap 480 includes a first layer 481 that is generally an annular ring and defines a plurality of axially extending bolt holes 481A. The assembly includes a second layer 482 that is generally planar and defines an opening 482B on a first half. The opening 482B forms the shape of a half moon. The opposing side is solid. The second layer includes a plurality of axially extending bolt holes 482A in a periphery thereof that align with the bolt holes in the first layer 481A. The assembly includes a third layer 483 that is generally planar and defines an open half moon 483B and a closed half moon shape. The third layer 483 is the above referenced door. The plate 480 extending distal from layer 483 is not shown in FIG. 8 but is illustrated in FIGS. 9A and 9B. The assembly includes keeper ring above the layer 484. The assembly further includes a layer four 485 defining an annular ring and having a plurality of bolt holes 487 extending along the periphery thereof. The bolt holes of the layers are alignable such that bolts may be axially received therethrough to retain the layers together.

The first layer 481 and the fourth layer 485 are rotatably fixed to the cylindrical element by welding, for example. The second layer 482 and the keeper 484 ring are rotatably fixed to the first layer and the second layer via the bolts. The third layer 483 is rotatable relative to the assembly. In this manner, the third layer 483 can be rotated to the open configuration, wherein the open section 4483B of the third layer 483B and the second layer 482B are aligned and the third layer can be rotated to the closed configuration, wherein the open section of the third layer 483B and the first layer 482B are misaligned, thereby closing the assembly. In this manner, the end cap is biasable between an open configuration and a closed configuration. In reference to FIG. 9A, an embodiment is shown wherein the system in in the open configuration. In reference to FIG. 9B, the same system is shown in the closed configuration. FIGS. 9A and 9B omit the first layer 481 for the purposes of illustration. FIGS. 9A and 9B illustrate a pin extending through the venter of the assembly 492. The plates may be centrally pinned, or alternatively maintained in position via the layers and bolts 486. The drawings are for illustration purposes and are not intended to limit the present invention.

In reference to FIGS. 7, 9A, 9B, 10, 11, the third layer includes a planar element 490 that is fixed thereto and extends distally along the longitudinal axis. The planar element 490 is configured to be received in the aggregate or soil matrix below the pipe. In the embodiment disclosed in the FIGS, the assembly is configured so that a rotation of the pipe in the first direction causes a rotation of the third layer relative to the pipe about the axis. The extending planar portion ensures that any friction between the layers does not inhibit the rotation of the third layer relative to the pipe. The pipe and layer rotate relative to each other during rotation of the pipe in the first direction by the torque driver until the third layer hits a stop, which inhibits rotation of the third layer relative to the pipe, during the rotation of the pipe in the first direction. When the third layer hits the stop, the assembly is in the closed configuration. Thereby providing surfaces to form the lifts of aggregate. The assembly in this manner further inhibits compaction of aggregate into the distal end of the bore. The assembly in this manner, further inhibits flow of aggregate through the opening in the distal end of the pipe.

When the pipe is rotated in the second direction about the axis, the third layer rotates relative to the distal end. The extending planar element facilitates the rotation. The third layer rotates until the assembly is biased to the open configuration. The assembly includes a second stop, that inhibits further rotation after the assembly is fully open. In this manner, aggregate can pass through the distal end of the system and being drawn by gravity therethrough. This process can be repeated and lifts can be formed. In the manner, the inventor assembly facilitates delivery of gravel to form the lifts. The assembly further inhibits unwanted compaction in the distal end thereof, while also providing substantial surface perpendicular to the axis (or angled relative thereto in the case of frustum elements)

Figure 10:
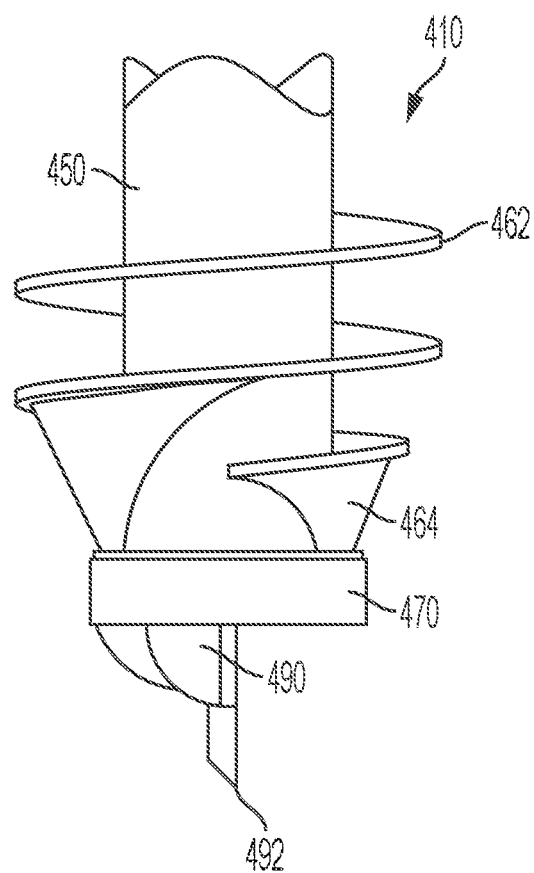
FIG. 10 is a view of a distal end of a system for installing an aggregate pier in accordance with one embodiment of the present invention.
Figure 11:
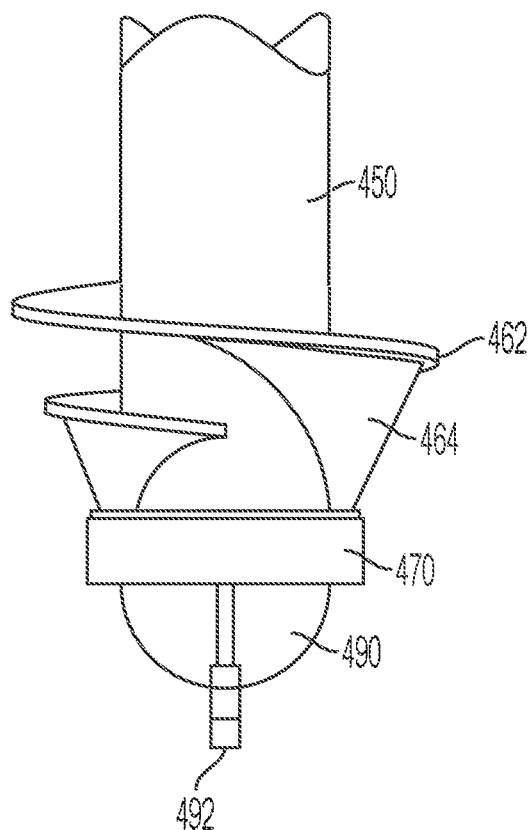
FIG. 11 is a view of a distal end of a system for installing an aggregate pier in accordance with one embodiment of the present invention.

In reference to FIG. 10, a front view of a distal end of the system 410 is shown. In FIG. 11, the side view of the system 410 is shown. In this embodiment, the helix 462 extends along the outside surface of the pipe for about two pitch lengths. That is, it wraps twice around the outside surface of the pipe. The compacting device 464 extends substantially around the outside surface of the pipe in a plane substantially perpendicular to the pipe axis. The term substantially is used to connote that the position and configuration device may (as shown in FIGS. 10-11) to account for the configuration of the helix. For example, the contact point of the helix with the outside surface of the pipe varies along the periphery. Likewise, the radial and proximal extensions of the compacting device may vary. For this purposes of this disclose, substantially around the outside surface of the pipe shall mean at least two third of the periphery, and a plane substantially perpendicular to the pipe axis shall mean a plane that bisects the pipe axis between the helix and the distal end and that results in a compacting device and surface capable of imparting a radial and axial force on the aggregate.

In FIG. 12, a view of the assembled system 410, with the torque driver is shown. In this embodiment, the system assembly is completed prior to use of the system to build a pier. In reference to FIG. 13A-13D, an embodiment of an end cap 580 is shown. In this embodiment, the end cap 580 is slidably disposed in the pipe 550. When the pipe is retracted, gravity opens the assembly and aggregate can pass therethrough. When the pipe is advanced, the assembly closes, providing a compacting surface. The assembly is opened and closed via a sliding of the end-cap 580 in the bore of the pipe 550. The distal end includes a stop 552 to inhibit at least one ring 553 of the end cap from falling out of the system.

In some embodiments of the present invention, the elements of the aggregate pier may be reinforced after the installation step by grouting. It should be understood that while a post installation grouting step is disclosed herein, the present invention is not limited in this regard and that the aggregate piers in accordance with the present invention may be installed and used without a post installation grouting step. In one embodiment of the present invention, a tremie grouting technique is used to grout an installed aggregate pier or a portion thereof. A tremie pipe is inserted into the aggregate pier via a rotation or driving. The pipe may have a cap on the end. The tremie pipe is inserted along an axis substantially parallel to the axis of the aggregate pier. A crowd force or rotation force may be applied to the pipe to install the pipe into the aggregate pipe. After the pipe is installed a cement or grout is pumped through the pipe as it is withdrawn from the system. The end cap is retained in position in the pier and grout is pumped into the space between the crushed aggregate. The pipe may also include one or more ports for delivering grout to the pier. In this manner, an aggregate pier in accordance with the present invention can be further solidified and strengthen so as to provide desired properties for providing support for subsequent construction.

A person of skill in the art will understand that many different types of aggregate may be used with the present invention. In one embodiment, the aggregate used with the invention, it is "clean" stone with maximum particle size of typically less than 2 inches. By the term "clean stone" it is meant that it typically contains less than 5% passing the No. 200 sieve size (0.074 inches). Alternative aggregate compositions may also be used such as clean stone having maximum particle sizes ranging between ¼-inch and 3 inches, aggregate with more than 5% passing the No. 200 sieve size, recycled concrete, slag, recycled asphalt, sand, glass, and other construction materials. It should be understood that the type of aggregate is provided by way of example and is not intended to limit the present invention.

The system in accordance with the present invention was used to build piers that were tested. The generalized subsurface conditions, based on the explorations and historic explorations, are discussed below. The location had existing fill to depths of 8 to 13 feet. The fill generally consisted of brown or black, fine to coarse sand with up to 35% silt, 35% gravel, and 10% concrete. Naturally-deposited alluvial deposits were encountered below the existing Fill. the top of the alluvial deposits ranged from 8.5 to 13 feet, corresponding to about El. 274.1 to 279.9 feet. The alluvial deposits extended to the bottom of each exploration and was not fully penetrated. The alluvial deposits generally consisted of tan or grey, fine to coarse sand with up to 50% gravel and up to 10% silt, or tan or grey, fine sand with up to 50% silt and 35% gravel. Groundwater ranged from about 19.7 to 19.9 feet below existing ground surface, corresponding to about El. 274.1 to 274.3 feet. Fluctuations in groundwater levels will vary due to seasonal variation in rainfall, temperature, and other factors different than those prevailing at the time the reading were taken.

A ground improvement program was designed to support the new building consisting of 113 aggregate piers. The aggregate piers were designed as 20-inch diameter, ungrouted columns of ¾-inch crushed stone installed with displacement methods. The aggregate piers were based on maximum building column and wall loads of 169 kips and 20 kips/foot, respectively. The aggregate piers were designed to fully penetrate and improve the existing Fill. It was assumed an initial crushed stone stiffness (subgrade modulus) of 125 pounds per cubic inch (pci), which was confirmed with a modulus test. The 20-inch diameter test pier was installed to a depth of 7.8 feet below working grade and included a tell-tale to the approximate bottom of stone column elevation. The test pier was installed using a Digga 30 ADS hydraulic driven torque motor mounted on a CAT 314 hydraulic excavator and was installed using an up stroke of 3 feet and down stroke of 1 foot. The design stress applied to the stone column from the foundation was about 13.8 kips per square foot. During the modulus test, the top of pier deflection at the design stress was about 0.45 inches. The subgrade modulus of the stone column at the design stress was over 200 pci, which is greater than 125 pci assumed in design. Based on the results of the aggregate pier modulus test, estimated total settlement on the order of 0.5 inches is expected for the helical piles and 0.45 inches for the aggregate piers. The total settlements are less than the normally acceptable tolerance of 1 inch for spread foundation design.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What is claimed is:

1. A system for installing an aggregate pier in a soil matrix, the system comprising:
a pipe extending along a pipe axis between a distal end and a proximal end, wherein an area of the pipe remote from the distal end of the pipe is configured to interface with a torque driver for rotating the pipe about the pipe axis, the pipe being rotatable in a first direction about the pipe axis, and the pipe being rotatable in a second direction about the pipe axis, the second direction being opposite the first direction,
an end cap slidably disposed within the distal end of the pipe, wherein the pipe has a first configuration closing the distal end of the pipe and a second configuration wherein the distal end of the pipe is open, the first configuration and the second configuration defined by the location of the end cap with respect to the pipe; and,
a helix disposed on the pipe between the proximal end and the distal end, the helix extending along at least a portion of an outer surface of the pipe, the helix extending radially from the pipe axis between the outer surface of the pipe to an outer edge of the helix, the helix configured such that when the helix is received in the soil matrix and the pipe is rotated in the first direction the helix imparts an axial force on the pipe in the direction of the distal end of the pipe thereby advancing the pipe into the soil matrix and transitioning the end cap into the first configuration, and the helix further configured such that when the helix is received in a soil matrix and the pipe is rotated in the second direction the helix imparts an axial force on the pipe in the direction of the proximal end of the pipe thereby withdrawing the pipe from the soil matrix and transitioning the end cap to the second configuration.

2. The system according to claim 1, wherein the end cap is placed into the first configuration by advancement of the pipe into the soil matrix, the end cap thereby forming a compaction surface.

3. The system according to claim 1, wherein the end cap is slidably transitioned from the first configuration to the second configuration by gravity.

4. The system according to claim 1, wherein the end cap further comprises at least one ring disposed on a proximal end of the end cap, the ring exhibiting a smaller outer diameter than an inner diameter of the pipe, such that the ring is slidable within the pipe.

5. The system according to claim 4, further comprising at least one stop disposed at the distal end of the pipe, the at least one stop having an inner diameter smaller than the inner diameter of the pipe wherein the at least one stop retains the at least one ring of the end cap within the pipe when the end cap is slidably transitioned from the first configuration to the second configuration.

6. The system according to claim 1, wherein a portion of the end cap which is disposed within the pipe is configured to permit the passage of aggregate thereby and out the distal end of the pipe.

7. The system for installing an aggregate pier in a soil matrix according to claim 1, wherein the pipe comprises:
a plurality of sections;
wherein the sections are combined to increase a length of the pipe.

8. A method for installing an aggregate pier in a soil matrix, the method comprising the steps of:
providing a pipe extending along a pipe axis between a distal end and a proximal end, and an end cap slidably disposed within the distal end of the pipe, wherein the pipe has a first configuration closing the distal end of the pipe and a second configuration wherein the distal end of the pipe is open, the first configuration and the second configuration defined by the location of the end cap with respect to the pipe;
rotating the pipe in the first direction to the advance the pipe into the soil matrix until the distal end of the pipe reaches a depth of the aggregate pier, wherein advancing the pipe transitions the end cap to the first configuration;
forming a portion of the aggregate pier by the following sequence of steps:
  (a) rotating the pipe in the second direction to withdraw a portion of the pipe from the soil matrix thereby creating a void below the distal end of the pipe, wherein withdrawing the pipe transitions the end cap to the second configuration;
  (b) filling the void with aggregate by passing the aggregate through the pipe, past the end cap and the first opening and into the void;
  (c) rotating the pipe in the first direction, thereby transitioning the end cap back to the first configuration, so that the end cap contacts the aggregate disposed in the void and imparts an axial and radial force thereto.

9. The method for installing an aggregate pier in a soil matrix according to claim 8, the method further comprising the steps:
repeating the steps of (a), (b), (c);
wherein the steps are repeated to form the aggregate pier in the soil matrix.

10. The method for installing an aggregate pier in a soil matrix according to claim 8, wherein the distal end of the pipe moves a distance W along the pipe axis during the step of (a) rotating in the second direction to withdraw pipe, wherein the distal end of the pipe moves a distance A along the pipe axis during the of step (c) of rotating in the first direction advance the pipe into the soil matrix;
wherein the ratio of W to A is greater than 1:1.

11. The method for installing an aggregate pier in a soil matrix according to claim 10, wherein the ratio of W to A is greater than 2:1.

12. The method for installing an aggregate pier in a soil matrix according to claim 11, wherein the ratio of W to A is 3:1.

13. The method for installing an aggregate pier in a soil matrix according to claim 10, wherein each sequence of steps (a), (b), (c) creates a lift in the aggregate pier.

* * * * *